United States Patent Office 3,054,056
Patented Sept. 11, 1962

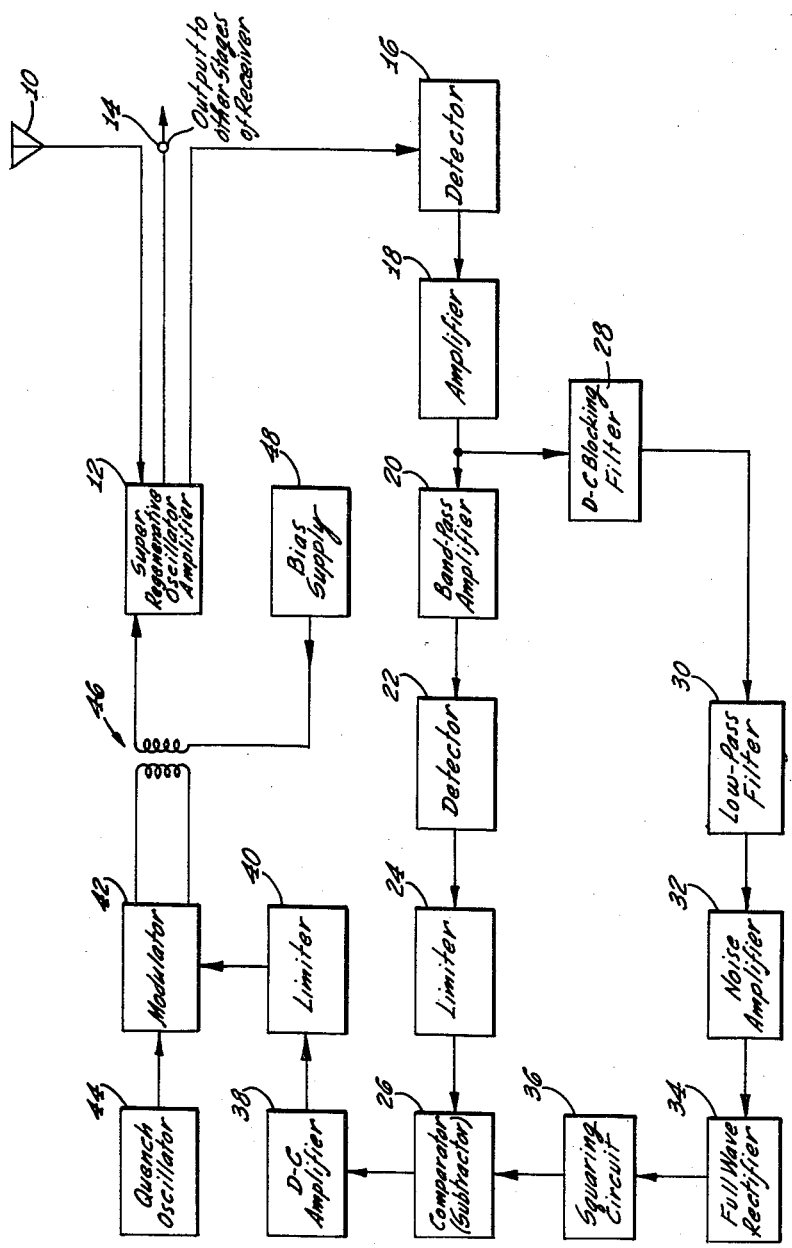

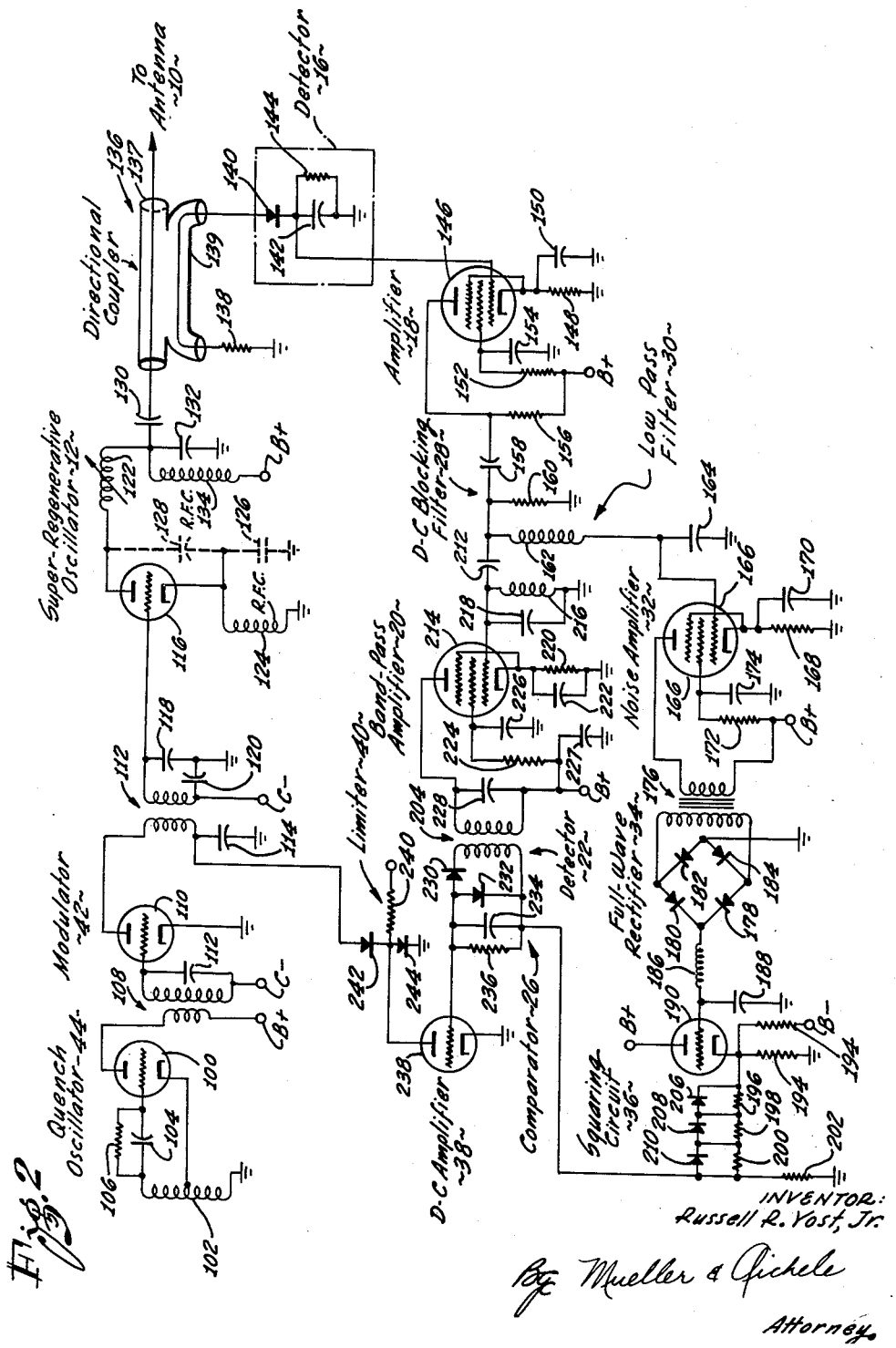

3,054,056
SUPER-REGENERATIVE CIRCUIT WITH AUTO-
MATIC GAIN CONTROL
Russell R. Yost, Jr., Phoenix, Ariz., assignor to Motorola,
Inc., Chicago, Ill., a corporation of Illinois
Filed Nov. 15, 1960, Ser. No. 69,352
10 Claims. (Cl. 325—340)

The present invention relates to automatic gain control circuits, and it relates more particularly to an automatic gain control circuit for a super-regenerative receiver or amplifier.

The performance of super-regenerative circuitry and systems is critically dependent upon the parameters of the system. For that reason, the need for controls, such as the automatic gain controls, in super-regenerative systems, has long been recognized. For the most part, the so-called automatic gain control systems of the prior art are not actually gain control systems in the true sense. These prior art systems functions to maintain the output signal level, rather than the gain, of the controlled super-regenerative receiver or amplifier substantially constant. The so-called automatic gain control systems of the prior art are adequate for some purposes. However, there are many present day systems in which it is essential that the true gain, rather than the output, of a super-regenerative receiver or amplifier be maintained essentially constant.

One typical example of a system in which it is important for the gain, rather than the output of a super-regenerative receiver to be held constant, is in a radar augmenter incorporating a super-regenerative receiver and which is used to receive continuous-wave radar signals. When a super-regenerative receiver is used to receive the pulse-type of radar signals; the usual prior art type of automatic gain control, constructed to respond to the noise level between the radar pulses, can be used. This type of prior art automatic gain control system is not appropriate, however, when the input signal to the super-regenerative receiver is of the continuous-wave type. Continuous-wave radar signals are encountered, for example, in frequency-modulation or Doppler radar systems. Such radar augmenters are used particularly to enhance the echo signals received from small targets, such as missiles. In radar augmenters, it is essential that the actual power gain be maintained essentially constant, regardless of signal level, up to a point where saturation of the available output power takes place. This is because the effective area, or radar cross-section, is proportional to the power gain of the augmenter, and for purposes of simulating a larger aircraft and for keeping test conditions under proper control, a constant and known radar cross-section is desirable.

The automatic gain control system of the invention is conceived to control actual gain, rather than output signal level, and for that reason is well suited for use in radar augmenters. The application of the improved gain control system of the invention, however, is by no means limited to the particular radar augmenter application referred to above. In fact, the present invention finds utility in any of the many systems used for measuring low radio frequency levels, and it can be used in general in any applicaction where a super-regenerative receiver or amplifier having a controlled gain, rather than a controlled output signal level, may find utility.

A general object of the present invention is, therefore, to provide an improved system for controlling the gain, rather than the output signal level, of a super-regenerative system.

A feature of the invention resides in the provision of means for producing a control signal which is derived from a comparison of a squared function of the noise signal components of the detected radio frequency output of a super-regenerative system with the quench frequency components of the system, and for utilizing this control signal to control the gain of the super-regenerative system so as to maintain the amplitude of that control signal essentially constant for essentially constant gain in the system. Specifically, in the embodiment to be described, a high gain direct current amplifier is used which, through closed loop action, attempts to null the output of the comparator. Thus the actual value of the "constant" is a null, or as close to a null as can be practically attained.

The above and other features of the invention are set forth in the claims. The invention itself will be best understood from a consideration of the following detailed description and of the accompanying drawings in which:

FIGURE 1 is a block diagram of a portion of a super-regenerative receiver and of an automatic gain control system, the automatic gain control system being constructed in accordance with the concepts of the present invention and used to control the gain of the super-regenerative oscillator-amplifier stage of the receiver; and FIGURE 2 is a circuit similar to the system of FIGURE 1, and which includes a super-regenerative amplifier which may be used for receiving or transmitting signals over the associated antenna illustrated therein.

The usual super-regenerative receiver includes an oscillator which is controlled to assume alternately an oscillating and a non-oscillating condition at a low frequency rate and under the control of a "quench" signal alternating at the low frequency rate. With proper adjustment, oscillations will build up in the super-regenerative receiver near the positive peaks of each cycle of the low frequency quench signal, and these oscillations will die out when the quench signal is negative or of an amplitude too low to provide oscillating conditions.

In the absence of a received signal, the oscillations which build up in the super-regenerative receiver during each cycle of the low frequency quench signal commence with an initial amplitude determined by the noise voltages in the input circuit of the receiver, and these oscillations reach a final value corresponding, in the linear mode to be described, to a value determined by the maximum positive amplitude of the quench signal. These oscillations then die out in each cycle of the quench signal, as the positive amplitude of the quench signal decreases and as the quench signal swings negative. For proper operation of the super-regenerative receiver, the oscillations must decay to an amplitude less than the input circuit noise before the oscillating condition of the oscillator is again restored by the next positive half-cycle of the quench signal.

When a received signal voltage is superimposed on the signals in the system, and when the received signal is larger in magnitude than the thermal agitation noise signals in the tuned input circuit of the super-regenerative receiver; then, when the oscillations start to build up for each positive half-cycle of the quench signal, their initial amplitude corresponds to the amplitude of the super-imposed received signal rather than to the smaller amplitude noise signals in the input circuit. The oscillations, therefore, reach a larger amplitude than before because of the larger initial amplitude. The action of the received signal is accordingly to increase the height and width and thus the average area under the envelope of the oscillations produced in the super-regenerative receiver by an amount which becomes greater as the amplitude of the received signal becomes larger.

The super-regenerative principle, as described above, provides a simple means for obtaining a large amount of radio frequency amplification at frequencies which are difficult to amplify by other means. This extremely high sensitivity may be achieved, moreover, by means of a single discharge tube.

There are two modes of operation defined for super-regenerative systems. These are the "linear" mode described above, and the "logarithmic" mode. The linear mode results when the positive quench period is so short that the oscillations do not have time to build up to full saturation amplitude. The logarithmic mode occurs when the positive quench period is sufficiently long to allow oscillations to build up in the super-regenerative receiver, or amplifier, to full amplitude before the end of the positive quench period. The super-regenerative receiver to be described herein will be assumed to be operating in the linear mode.

The super-regenerative receiver illustrated in FIGURE 1 includes an antenna 10. This antenna, for example, may intercept any received continuous wave signal. Moreover, this continuous wave signal, for example, may be derived from the transmitted signal in a frequency modulation or Doppler radar system, as received at the location, for example, of the radar augmenter. The antenna 10 is coupled to a super-regenerative oscillator-amplifier 12. In accordance with known super-regenerative techniques, the oscillator-amplifier 12 develops a series of bursts of oscillation which occur at the period of the quench frequency, and which have an amplified amplitude related to the input signal in the described manner. These series of oscillations from the stage 12 may be applied to the other stages of the receiver by way of an output terminal 14. As will be described in conjunction with FIGURE 2, the portion of the receiver disclosed in FIGURE 1 may be used as a super-regenerative amplifier apart from the receiver. In the latter event, the terminal 14 is not required. The other stages of the super-regenerative receiver may be of any known type, and for that reason are not illustrated herein. The series of bursts of oscillation from the oscillator-amplifier 12 are also sampled by a detector 16, this detector being suitably decoupled from the circuitry of the terminal 14 so that it does not present a material load to that circuit. The coupling between the oscillator-amplifier 12 and the detector 16 can best be provided by a directional coupler between the oscillator-amplifier 12 and the antenna 10, as will be described. If the antenna is well matched to the transmission line, a directional coupler is not really necessary, and any appropriate non-frequency selective coupling network can be used.

The detector 16 may be connected to function as a square law detector at a selected transition point when the input signals fall below a particular amplitude threshold. The resulting detected signals from the detector 16 are introduced to an amplifier 18 in which they are amplified. The amplifier 18 is connected to a band-pass amplifier 20. This latter amplifier is constructed to pass the quench signal frequency from the amplifier 18. The signal passed by the band-pass amplifier 20 is rectified in a detector 22 to produce a unidirectional control signal which has an amplitude related to the amplitude of the signal from the amplifier 20. The unidirectional control signal from the detector 22 is passed through a limiter 24 to a comparator circuit 26. The limiter 24, for reasons to be described subsequently, serves to limit the amplitude of the unidirectional control signal from the detector 22 so that it will not rise above a predetermined limiting amplitude.

The output signals from the amplifier 18 are also passed through a direct current blocking filter 28 to a low pass filter 30. The filter 28 blocks the desired signal, and in the system described wherein a continuous wave is being amplified, the desired signal at the output of the detector is a direct current. The low pass filter 30 passes signals occurring in a band extending from direct current up to the quench signal frequency, and it introduces noise signals in that band to a noise amplifier 32. The amplified noise signals from the amplifier 32 are then rectified in a full wave rectifier 34 to produce a unidirectional control signal. The resulting unidirectional control signal is squared in a squaring circuit 36, and the latter circuit provides a further unidirectional control signal having an amplitude corresponding to the square of the amplitude of the unidirectional control signal from the full wave rectifier 34.

The comparator 26 serves to compare the unidirectional control signal from the detector 22, as passed by the limiter 24, with the unidirectional control signal from the squaring circuit 36. The comparator 36 produces an error signal as a result of that comparison. The amplitude of the error signal produced by the comparator 26 is equal to the difference between the two unidirectional control signals applied to the comparator by the circuits 24 and 36. The error signal from the comparator 26 is amplified in a direct current amplifier 38, and it then passed through an amplitude limiter 40 to a modulator 42. The limiter 40 serves to prevent the amplitude of the amplified error signal from exceeding a predetermined threshold.

The super-regenerative receiver system includes a quench oscillator 44 which produces the low frequency quench signal, and the quench signal is passed through the modulator 42 to a coupling network 46. The coupling network 46 is connected to the super-regenerative oscillator-amplifier 12 and to a bias supply 48 for the oscillator-amplifier 12. The error signal from the limiter 40 serves to control the amplitude of the quench signal introduced through the coupling network 46 to the super-regenerative oscillator-amplifier 12.

The stages described above, with the exception of the stages 12, 48 and 44, constitute an automatic gain control system for the super-regenerative oscillator-amplifier 12 which embodies the concepts of the present invention. This automatic gain control system, as will become evident as the present description proceeds, serves to control the power gain of the super-regenerative oscillator-amplifier 12 in a manner to maintain that gain essentially constant.

As noted above, it is assumed that the super-regenerative receiver system of FIGURE 1 is operating in the linear mode. Then, the output from the super-regenerative oscillator-amplifier 12 in the absence of a received signal from the antenna 10 consists of a series of bursts of oscillation originating from the thermal agitation in the oscillator-amplifier 12. These bursts of oscillation occur during the positive half-cycles of the low frequency quench signal derived from the quench oscillator 44. The peak of the burst of oscillation occurs at the instant the quench signal passes through the value where oscillations are just barely sustained. This is the same value where oscillations just begin to build up, except that the quench signal is swinging in the "non-oscillating" direction. When a received continuous wave signal is injected into the super-regenerative oscillator-amplifier 12 from the antenna 10, and when the receiver is operating in the linear mode, the peak value of the bursts of oscillation increases with the input signals, as explained above, and therefore the average value also increases. The series of bursts of oscillation from the super-regenerative oscillator-amplifier 12 are applied to the output terminal 14 for detection in the subsequent stages (not shown) of the super-regenerative receiver. The bursts are also sampled and detected by the automatic gain control system detector 16. The detector 16, as noted above, is decoupled from the circuit of the output terminal 14 to avoid excessive energy loss into the detector 16. The output signals from the detector 16 are amplified in the amplifier 18, and the amplified output signals from that amplifier are selectively introduced to two separate paths in the automatic gain control system.

The first path in the automatic gain control system includes the band-pass amplifier 20 which serves to pass the quench frequency component ($f_q$) of the amplified output of the amplifier 18. The second path of the automatic gain control system includes the direct current blocking filter 28 and the low pass filter 30. These latter two filters serve to pass the noise components of the output of the amplifier 18 which extend in the band from direct current to just below the quench frequency ($f_q$).

For small inputs, the detector 16 functions as a square-law detector. Then the amplitude ($A_q$) of the detected quench signal at the output of the amplifier 18 is given by the following equations:

$$A_q = C_1 2\sigma^2(1+[1/2]r^2) = C_1 2\sigma^2(1+r^2/2) \quad (1)$$

$$\sigma = (\overline{V_{ns}^2} \cdot G_p)^{1/2} \quad (2)$$

$$r = \frac{V_1}{\sigma} \quad (3)$$

Where:

$C_1$ is a constant of proportionality independent of other parameters and determined by the portion of the frequency spectrum introduced to the quench signal frequency path;

$\sigma$ is the root mean square voltage at the end of the build up period in the absence of input signal;

$V_1$ is the amplitude of the peak of the output pulses that would result if the oscillations were built up from a continuous wave received input signal alone;

$1/2r^2$ is the signal-to-noise power ratio at the end of the build up period;

$\overline{V_{ns}^2}$ is the mean squared input noise;

$G_p$ is the total power gain;

$r$ is proportional to the signal-to-noise voltage ratio at the peak of the oscillation bursts (if the input signal level changes, $r$ changes in proportion, and $C_1$ remains constant).

The root mean square value of the deviations of the amplitudes of the output pulse from the amplifier 18 is given by the equation:

$$A_n = C_2 2\sigma^2 (1+r^2)^{1/2} \quad (4)$$

Where $C_2$ is a constant of proportionality independent of other parameters and determined by the portion of the frequency spectrum from the amplifier 18 used in the noise signal path of the automatic gain control system.

The automatic gain control system of FIGURE 1 derives a first unidirectional control signal at the output of the detector 22 which is proportional to the amplitude of the detected quench signal $A_q$ from the amplifier 20. The automatic gain control system of FIGURE 1 also derives a second unidirectional control signal at the output of the rectifier 34 which is proportional to the root mean square value of the noise signals from the amplifier 32. The latter unidirectional control signal is squared in the circuit 36 to produce a unidirectional control signal $A_n^2$ which corresponds to the square of the unidirectional control signal produced by the rectifier 34.

The unidirectional control signal from the detector 22 (received through the limiter 24) and the unidirectional control signal from the squaring circuit 36 are compared in the comparator circuit 26. This comparator circuit 26 develops an error signal which is proportional to the difference between these two unidirectional control signals, as mentioned above. The error signal is used to control an appropriate parameter of the super-regenerative oscillator-amplifier 12. In the system of FIGURE 1, for example, the error signal from the comparator 26 is used to control the amplitude of the quench signal applied to the super-regenerative oscillator-amplifier 12 from the quench oscillator 44. This latter control is effectuated in the modulator 42.

The automatic gain control system of FIGURE 1 functions to control the power gain ($G_p$) of the super-regenerative oscillator-amplifier 12 in a manner such that:

$$A_n^2 = C_3 A_q \quad (5)$$

Where: $C_3$ is a constant.

Therefore:

$$C_2^2 4\sigma^4 (1+r^2) = C_3 C_1 2\sigma^2 (1+1/2r^2) \quad (6)$$

Thus:

$$\sigma^2 = \frac{C_1 C_3}{2C_2^2} \frac{(1+r^2/2)}{(1+r^2)} \quad (7)$$

yielding $$G_p = \frac{C_1 C_3}{2C_2^2 \overline{V_{ns}^2}} \frac{(1+r^2/2)^{1/2}}{(1+r^2)^{1/2}} \quad (8)$$

The term $\overline{V_{ns}^2}$ is relatively constant, depending on a linear relationship upon the operating current of the discharge tube in the super-regenerative oscillator-amplifier 12 at the point where oscillations begin. As the term "$r$" varies from 0 to infinity, the quality $$(1+r^2/2)(1+r^2)^{-1/2}$$

varies only from 1 to ½, corresponding to a 3 decibel variation in the power gain term $G_p$. For the more appropriate signal-to-noise power ratios ranging from 1 to infinity, $r^2$ varies from 2 to infinity, and the total variation of the power gain $G_p$ would only be 2.1 decibels or ±1.05 decibels. It should be noted that the control is exerted on the power gain $G_p$, as is the intended purpose of the invention, rather than on the signal output, which would be related to $A_q$ for large signal-to-noise ratios, and the actual power gain $G_p$ is held relatively constant by the automatic gain control system of the invention.

For very large outputs, the detector 16, instead of functioning as a square-law detector, may begin to function as a linear detector. Should that condition arise, it can be shown that the noise portion of the output signal becomes nearly independent of the continuous wave input signal. In such a situation:

$$A_n \cong C_2 \sigma \left(1 - \frac{0.304}{r^2}\right)^{1/2} \quad (9)$$

In the approximation of Equation 9, terms of the order of $r^{-6}$ have been neglected as being small compared to unity. Inasmuch as the detector 16 will not become linear until the term "$r$" is fairly large (of the order of 10 or larger, for example) it will be observed that the noise output will be virtually independent of the term "$r$" when the detector 16 operates in the linear portion of its characteristic. When this occurs, the limiter 24 is used to create a fixed reference to which the squared noise signal from the squaring circuit 36 is compared. Then, the automatic gain control system will operate to hold:

$$A_n^2 = C_4 \quad (10)$$

Where: $C_4$ is a constant.

That is:

$$C_2^2 \sigma^2 = C_4 \quad (11)$$

so that $$G_p = \frac{C_4}{C_2^2 \cdot \overline{V_{ns}^2}} \quad (12)$$

By the appropriate adjustment of the threshold and the ultimate limit of the limiter 24, the square-law to linear transition region of the detector 16 can be satisfactorily matched so that the gain of the super-generative oscillator-amplifier 12 can be within a few decibels for signal-to-noise ratios from unity up to a point where saturation of the oscillator-amplifier 12 takes place. When such saturation occurs, the noise signals will tend to decrease, and the automatic gain control system will attempt to drive the super-regenerative oscillator-amplifier 12 in a manner to produce more gain, which the oscillator-amplifier is unable to do. It is for that reason the limiter 40 is interposed between the direct current amplifier 38 and the modulator 42.

The circuitry of FIGURE 2 includes an electron discharge device 100 of the triode type. The cathode of the triode 100 is connected to an intermediate tap on an inductance coil 102. One terminal of the inductance coil 102 is grounded, and the other terminal is connected to a capacitor 104. The capacitor 104 is shunted by a resistor 106, and these elements are connected to the control grid of the triode 100. The anode of the triode 100 is connected to one terminal of the primary of a coupling transformer 108, the other terminal of the primary being connected to the positive terminal B+ of a source of unidirectional potential.

The secondary of the coupling transformer 108 is connected to the negative terminal C— of a source of unidirectional biasing potential and to the control grid of a triode 110. The secondary is shunted by a capacitor 112. The cathode of the discharge device 110 is grounded, and the anode is connected to one terminal of the primary of a coupling transformer 112. The other terminal of the primary of the coupling transformer 112 is connected to a grounded capacitor 114.

The secondary of the transformer 112 is connected to the control grid of an electron discharge device 116. This discharge device, and the discharge device 110 may be of the triode type. One terminal of the secondary is connected to a grounded tuning capacitor 118, and the other terminal is connected to a grounded capacitor 120 and to the negative terminal of another biasing source C—.

The anode of the triode 116 is connected to a variable inductance coil 122, and the cathode of the triode 116 is connected to a grounded radio frequency choke 124. The stray cathode capacitance 126 appears in shunt with the radio frequency choke 124, and the stray anode-cathode capacitance is designated 128. The impedance of the choke coil 124 is much higher than the impedance of the capacitance 126; and the resonant frequency of the combination is below the operating frequency of the over-all circuit. The two capacitances 128 and 126 form a voltage divider which determines the feedback ratio of the oscillator in accordance with usual Colpitts principles.

The other terminal of the inductance coil 122 is connected to a coupling capacitor 130, to a grounded capacitor 132, and to a radio frequency choke 134. The other terminal of the choke is connected to the positive terminal B+.

The coupling capacitor 130 is connected to a directional coupler 136 which, in turn, is connected to the antenna 10 in FIGURE 1. The directional coupler is also connected to a grounded resistor 138 and to the anode of a diode 140. The cathode of the diode 140 is connected to a grounded capacitor 142, and the capacitor is shunted by resistor 144.

The junction of the diode 140 and the capacitor 142 is connected to the control grid of an electron discharge device 146. The latter discharge device may be of the pentode type. The cathode of the discharge device 146 is connected to a grounded resistor 148, the resistor being shunted by a capacitor 150. The suppressor grid of the device 146 is connected to the cathode, and the screen grid is connected to a resistor 152 and to a grounded capacitor 154. The resistor 152 is connected to the positive terminal B+, as is a resistor 156. The anode of the discharge device 146 is connected to the junction of the resistor 156 and a capacitor 158.

The capacitor 158 is connected to a grounded resistor 160 and to an inductance coil 162. The inductance coil 162 is connected to a grounded capacitor 164 and to the control grid of an electron discharge device 166. The discharge device 166, likewise, may be of the pentode type. The suppressor grid of the device 166 is connected to the cathode, and the cathode is connected to a grounded resistor 168. The resistor 168 is shunted by a grounded capacitor 170. The screen grid of the discharge device 166 is connected to a resistor 172 and to a grounded capacitor 174. The resistor 172 is connected to the positive terminal B+ of a unidirectional potential source, the negative terminal of which is grounded. The anode of the device 166 is connected to the primary of a coupling transformer 176, the other terminal of the transformer being connected to the positive terminal B+.

The secondary of the transformer 176 is connected across the diagonals of a full-wave rectifier network formed by a plurality of diodes 178, 180, 182 and 184. The other diagonal of the full-wave rectifier is grounded and is connected to an inductance coil 186.

The inductance coil 186 is connected to a grounded capacitor 188 and to the control grid of an electron discharge device 190. The electron discharge device 190 is of the triode type. The cathode of the device 190 is connected to the junction of a pair of resistors 192 and 194. These resistors are connected across the negative terminal B— of a second unidirectional source and ground. The positive terminal of the second source is grounded. The anode of the discharge device 190 is connected to the positive terminal B+ of the first source of unidirectional potential.

The cathode of the discharge device 190 is connected to a resistor 196. This resistor is connected to a second resistor 198, and the second resistor is connected to a third resistor 200. The resistor 200 is connected to a grounded resistor 202 and to one terminal of the secondary of a coupling transformer 204. The resistor 196 is shunted by a Zener diode 206, the resistor 198 is shunted by a Zener diode 208, and the resistor 200 is shunted by a Zener diode 210.

The capacitor 158 is also connected to a capacitor 212, and the latter capacitor is connected to the control grid of an electron discharge device 214, of the pentode type. The control grid of the device 214 is connected to a grounded inductance coil 216, and the inductance coil is shunted by a capacitor 218. The suppressor grid of the device 214 is connected to the cathode, and the cathode is connected to a grounded resistor 220, the resistor 220 being shunted by a capacitor 222. The screen grid of the device 214 is connected to a resistor 224 and to a grounded capacitor 226. The resistor 224 is connected to the positive terminal B+ and to a grounded capacitor 227.

The anode of the discharge device 214 is connected to the primary of the transformer 204. The primary is shunted by a tuning capacitor 228, and it is also connected to the positive terminal B+.

The secondary of the transformer 204 is also connected to the cathode of a diode 230 and to the cathode of a diode 232. The anode of the diode 232 is connected to the anode of the diode 230. The secondary of the transformer 204 is shunted by a by-pass capacitor 234, and the capacitor is shunted by a resistor 236. The capacitor 234 is associated with a usual diode detector circuit which includes the diode 230, the resistor 236 and the capacitor 234. The anodes of the diodes 230 and 232 are connected to the control grid of an electron discharge device 238 which is of the triode type. The cathode of the discharge device 238 is grounded, and the anode is connected to a resistor 240, to the cathode of a diode 242, and to the cathode of a diode 244. The anode of the diode 244 is grounded, and the anode of the diode 242 is connected to the junction of the capacitor 114 and the primary of the transformer 112.

In the circuit of FIGURE 2, the electron discharge device 100 is connected to form the low frequency quench oscillator 44 of FIGURE 1, and the electron discharge device 110 is connected to form the modulator 42. In actual practice, it would probably be desirable to combine the circuitry of the discharge devices 110 and 100 in accordance with known practice.

The super-regenerative oscillator 12 of FIGURE 1 is formed by the circuitry of the electron discharge device 116. This oscillator, as noted above, is of the Colpitts type. The series capacitances 128 and 126 resonate with the series inductance 122 and capacitor 132. The capacitor 132 has a value chosen so that the antenna load, which is connected across it, is properly transformed to the desired impedance at the anode of the triode 116. The variable inductance 112 and fixed capacitor 132 make up a combination tuning network and L-pad for impedance matching.

The directional coupler 136 may be of the usual type, and it is used to couple the super-regenerative oscillator 12 to the square-law detector 116. The directional coupler shown in FIGURE 2 is of the type suitable for signal frequencies up to 5000 megacycles, for example. The illustrated coupler 136 of FIGURE 2 includes, for example, two parallel coaxial lines 137 and 139, with a coupling slot of about a half wavelength being formed in the common walls of the coaxial lines.

The diode 140 is connected to form the square-law detector 16 of FIGURE 1, and the circuitry of the pentode 146 forms the amplifier 18. The direct current blocking filter 28 of FIGURE 1 is formed by the capacitor 158 in FIGURE 2, and this rejects the signal components which, as previously stated, are direct currents. The inductance coil 162 and capacitor 164 form an inductance-capacitance filter arrangement constituting the low pass filter 30. The band-pass amplifier 20 includes the capacitors 212 and 218 and the inductance coil 216, as well as the other circuitry associated with the pentode 214.

The diode 230 is connected to form the detector 22, and the diode 232 functions as the limiter 24, the latter diode being of the Zener type. The limiter 24, as shown in FIGURE 1, is interposed between the detector 22 and the comparator 26. The circuitry of the pentode 166 forms the noise amplifier 32; and the diodes 178, 180, 182 and 184 are connected to form the full-wave rectifier 34.

The inductance coil 186 and the capacitor 188 form an inductance-capacitance filter, not shown in the block diagram of FIGURE 1. This filter serves to remove noise frequency components. The illustrated inductance-capacitance filter may be augmented by a resistance-capacitance filter, if necessary, for sufficient smoothing of the unidirectional signal produced by the full-wave rectifier 34.

The squaring circuit 36 of FIGURE 1 is constituted by the triode 190 in FIGURE 2 and by the resistance-diode network coupled to the cathode of that triode. This squaring circuit operates in known manner to produce a unidirectional output signal representing the square of the function represented by the input signal. The detector circuit of the diode 230 is connected in a floating relationship with the output terminal of the squaring circuit 36. This enables the output signal from the squaring circuit 36 to be summed with the output signal from the detector 22, and the algebraic sum of the two output signals to be applied to the control grid of the triode 238. The circuit of the triode 238 functions as the direct current amplifier 38 of FIGURE 1. The diodes 242 and 244 are Zener diodes, and they perform the function of the limiter 40.

The transformer 176 is constructed to exhibit a response over most of the frequency band below the frequency of the quench signal. This causes the noise signals amplified by the noise amplifier 32 to be passed to the full-wave rectifier 34 for detection. The filters 186, 188 provides that a unidirectional signal corresponding to the amplitude of the noise signals be applied to the squaring circuit 36. The squaring circuit 36 represents but one of many possible types. The illustrated squaring circuit approximates the desired parabolic output signal by four straight-line segments. The amplifier quench frequency signal, passed by the band-pass amplifier 20, is detected in the detector 22 and compared with the signal from the squaring circuit 36 in the manner described. The resultant output signal from the direct current amplifier 38 is used to control the system so as to maintain the true power gain constant, as also described in detail.

The various constants and parameters of the circuitry of FIG. 2 may vary in accordance with different design requirements. It is pointed out that the individual stages and circuit groups in the system are known to the art, and the specific design of these stages is well within the capabilities of an ordinary circuit designer. It is also pointed out that the illustrated circuitry of FIGURE 2 is in no way intended to limit the invention in any way. Many other equivalent circuits will readily occur to those skilled in the art, and which may be used as alternatives to the particular circuits illustrated in FIG. 2.

The invention provides, therefore, an improved automatic gain control system for a super-regenerative amplifier. The automatic gain control system of the present invention functions in the described manner to control the actual power gain of the system to maintain the power gain essentially constant, rather than to maintain the amplitude of the output signal essentially constant. As described above, this control of the actual power gain of the super-regenerative amplifier renders the control system of the invention suited for many applications in which the power gain, rather than the output signal level, must be maintained essentially constant.

I claim:

1. A super-regenerative system including in combination: super-regenerative means for producing bursts of oscillation recurring at the period of a predetermined quench signal frequency, detector means coupled to said super-regenerative means and responsive to the bursts of oscillation therefrom for producing first output signals having a frequency corresponding to the predetermined quench frequency and for producing a band of noise output signals, first filter and rectifier means coupled to said detector means for selecting the first output signals therefrom and for producing a first control signal in response thereto, second filter and rectifier means coupled to said detector means for selecting the noise output signals therefrom and for producing a second control signal in response thereto, further means coupled to said first rectifier means and to said second rectifier means for producing a third control signal in response to the first and second control signals, and means coupled to said further means and responsive to said third control signal for controlling said super-regenerative means in response thereto.

2. A super-regenerative system including in combination: super-regenerative means for producing bursts of oscillation recurring at the period of a predetermined quench signal frequency, detector means coupled to said super-regenerative means and responsive to the bursts of oscillation therefrom for producing first output signals having a frequency corresponding to the predetermined quench frequency and for producing a band of noise signals, first filter and rectifier means coupled to said detector means for selecting the first output signals therefrom and for producing a first unidirectional control signal in response thereto having an amplitude proportional to the amplitude of said first output signals, second filter and rectifier means coupled to said detector means for selecting the noise signals therefrom and for producing a second unidirectional control signal in response thereto having an amplitude related to the amplitudes of said noise signals, comparator means coupled to said first rectifier means and to said second rectifier means for producing a third unidirectional control signal related to the difference between said first and second unidirectional control signals, and means coupled to said comparator means for utilizing said third unidirectional control signal to control the gain of said super-regenerative means to maintain said gain essentially constant.

3. A super-regenerative system including in combination: super-regenerative means for producing bursts of oscillation recurring at the period of a predetermined quench signal frequency, detector means coupled to said super-regenerative means and responsive to the bursts of oscillation therefrom for producing first output pulses recurring at a frequency corresponding to the predetermined quench signal frequency and for producing noise signals in a predetermined frequency band, first filter and rectifier means coupled to said detector means for selecting the first output pulses therefrom and for producing a first unidirectional control signal in response thereto having an amplitude proportional to the amplitude of said first output pulses, second filter and rectifier means coupled to said detector means for selecting the noise signals therefrom and for producing a second unidirectional control signal in response thereto having an amplitude proportional to the average amplitude of said noise signals, squaring circuit means coupled to said second rectifier means for producing a third unidirectional control signal having an amplitude proportional to the square of the amplitude of said second unidirectional control signal, comparator circuit means coupled to said first rectifier means and to said squaring circuit means for producing a further unidirectional control signal having an amplitude related to the difference between said first and third unidirectional control signals, and means coupled to said comparator circuit means for utilizing said further unidirectional control signal to control the gain of said super-regenerative means in a manner to maintain the gain of said super-regenerative means essentially constant.

4. In a super-regenerative system which includes a super-regenerative oscillator for producing output signals having a particular frequency, a quench oscillator coupled to the super-regenerative oscillator for introducing a quench signal thereto of a frequency low as compared with said particular frequency so as to cause the super-regenerative oscillator to produce a series of bursts of oscillation recurring at the period of the quench signal frequency, the combination of: detector means coupled to said super-regenerative oscillator and responsive to the series of oscillations therefrom for producing first output signals having a frequency corresponding to the quench signal frequency and for producing a band of noise signals, first filter and rectifier means coupled to said detector means for selecting the first output signals therefrom and for producing a first control signal in response thereto, second filter and rectifier means coupled to said detector means for selecting the noise signals therefrom and for producing a second control signal in response thereto, further means coupled to said first rectifier means and to said second rectifier means for producing a third control signal in response to the first and second control signals, and means coupled to said further means and responsive to said third control signal for controlling said super-regenerative oscillator in response thereto.

5. In a super-regenerative system which includes a super-regenerative oscillator for producing an output signal having a particular frequency, a quench oscillator coupled to the super-regenerative oscillator for introducing a quench signal thereto of a frequency low as compared with said particular frequency so as to cause the super-regenerative oscillator to produce a series of bursts of oscillation recurring at the period of the quench frequency, the combination of: detector means coupled to said super-regenerative oscillator and responsive to the bursts of oscillation therefrom for producing first output signals having a frequency corresponding to the quench signal frequency and for producing a band of noise signals, first filter and rectifier means coupled to said detector means for selecting the first output signals therefrom and for producing a first unidirectional control signal in response thereto having an amplitude proportional to the amplitude of said first output signals, second filter and rectifier means coupled to said detector means for selecting the noise signals therefrom and for producing a second unidirectional control signal in response thereto having an amplitude related to the amplitudes of said noise signals, comparator means coupled to said first rectifier means and to said second rectifier means for producing a third unidirectional control signal related to the difference between said first and second unidirectional control signals, and means coupled to said comparator means for utilizing said third unidirectional control signal to control the gain of said super-regenerative oscillator in a manner to maintain said gain essentially constant.

6. In a super-regenerative system which includes a super-regenerative oscillator for producing an output signal having a particular frequency, a quench oscillator coupled to the super-regenerative oscillator for introducing a quench signal thereto of a frequency low as compared with said particular frequency so as to cause the super-regenerative oscillator to produce a series of bursts of oscillation recurring at the period of the quench frequency, the combination of: detector means coupled to said super-regenerative oscillator and responsive to the series of oscillations therefrom for producing first output pulses recurring at a frequency corresponding to the quench signal frequency and for producing noise signals in a band extending from direct current substantially up to the quench frequency, first filter and rectifier means coupled to said detector means for selecting the first output signals therefrom and for producing a first unidirectional control signal in response thereto having an amplitude proportional to the amplitude of said first output pulses, second filter and rectifier means coupled to said detector means for selecting the noise signals therefrom and for producing a second unidirectional control signal in response thereto having an amplitude proportional to the average amplitude of said noise signals, squaring circuit means coupled to said second rectifier means for producing a third unidirectional control signal having an amplitude proportional to the square of the amplitude of said second unidirectional control signal, comparator circuit means coupled to said first rectifier means and to said squaring circuit means for producing a further unidirectional control signal having an amplitude related to the difference between said first and third unidirectional control signals, and means coupled to said comparator circuit means for utilizing said further unidirectional control signal to control the gain of said super-regenerative oscillator in a manner to maintain said gain essentially constant.

7. In a super-regenerative system which includes a super-regenerative oscillator for producing an output signal having a particular frequency, a quench oscillator coupled to the super-regenerative oscillator for introducing a quench signal thereto of a frequency low as compared with said particular frequency so as to cause the super-regenerative oscillator to produce a series of bursts of oscillation recurring at the period of the quench frequency and having amplitudes determined by noise in the system in the absence of an input signal to the super-regenerative oscillator, and means for introducing such an input signal to the super-regenerative oscillator to control the amplitude of said series of bursts of oscillations therefrom, the combination of: detector means coupled to said super-regenerative oscillator and responsive to the bursts of oscillation therefrom for producing a first series of pulses recurring at the period of the quench signal frequency and for also producing noise signals extending through a particular frequency band, first filter and rectifier means coupled to said detector means for selecting said pulses and producing a first unidirectional control signal having a value proportional to the amplitude of the pulses of said first series, second filter and rectifier means coupled to said detector means for selecting said noise signals and producing a second unidirectional control signal having a value proportional to the average value of the amplitudes of said noise signals, squaring circuit means coupled to said second rectifier means for producing a third unidirectional control signal having a value proportional to the square of said second unidirectional control signal, comparator means coupled to said first rectifier means and to said squaring circuit means for producing an error signal proportional to the difference between said first and third unidirectional signals, and means coupled to said comparator means for utilizing said error signal to control the power gain of said super-regenerative oscillator in a manner to maintain said gain essentially constant.

8. A super-regenerative system including in combination: super-regenerative means for producing bursts of oscillation recurring at the period of a predetermined quench signal frequency, square-law detector means coupled to said super-regenerative means and responsive to the bursts of oscillations therefrom for producing first output signals having a frequency corresponding to the predetermined quench frequency and for producing a band of noise output signals, first filter means coupled to said detector means for passing said first output signals therefrom, first rectifier means coupled to said first filter means for producing a first control signal in response to said first output signal, second filter means coupled to said detector means for passing the noise output signals therefrom, second rectifier means coupled to said second filter means for producing a second control signal in response to said noise output signals, further means coupled to said first rectifier means and to said second rectifier means for producing a third control signal in response to said first and second control signals, and means coupled to said further means and responsive to said third control signal for controlling said super-regenerative means in response thereto.

9. The combination defined in claim 8 and in which said further means includes a squaring circuit coupled to said second rectifier means for producing a further control signal corresponding to the square of said second control signal, and in which said further means further includes a comparator circuit coupled to said squaring circuit and to said first rectifier means for comparing said further control signal with said first control signal to produce said third control signal.

10. A super-regenerative system including in combination: super-regenerative means for producing bursts of oscillation recurring at the period of a predetermined quench signal frequency, detector means coupled to said super-regenerative means and responsive to the bursts of oscillation therefrom for producing first output signals having a frequency corresponding to a predetermined quench frequency and for producing a band of noise output signals, said detector means functioning as a square-law detector for relatively small input signals and as a linear detector for relatively large output signals, first filter means coupled to said detector means for passing said first output signals therefrom, first rectifier means coupled to said first filter means for producing a first control signal in response to said first output signals, second filter means coupled to said detector means for passing the noise output signals therefrom, means including second rectifier means coupled to said second filter means for producing a second control signal in response to said noise output signals, further means coupled to said first rectifier means and to said second rectifier means for producing a third control signal in response to said first and second control signals, limiter means interposed between said first rectifier means and said further means for providing a fixed reference in said further means for said second control signal when said detector means functions as a linear detector, and means coupled to said further means and responsive to said third control signal for controlling the gain of said super-regenerative means in response thereto.

No references cited.